United States Patent [19]

Morgan

[11] Patent Number: 4,977,449
[45] Date of Patent: Dec. 11, 1990

[54] VIDEO SWITCHING SYSTEMS USING FREQUENCY AGILE MODULATORS AND DEMODULATORS

[76] Inventor: Jack B. Morgan, 2040 Pheasant Hill La., Auburn, Calif. 95603

[21] Appl. No.: 246,555

[22] Filed: Sep. 19, 1988

[51] Int. Cl.$^5$ .......................... H04N 7/10; H04N 7/18
[52] U.S. Cl. ........................................ 358/86; 358/108
[58] Field of Search ................ 358/86, 108; 455/4, 455/5; 370/3

[56] References Cited

U.S. PATENT DOCUMENTS

| 4,530,084 | 7/1985 | Strebel et al. | 370/3 |
| 4,777,526 | 10/1988 | Saitoh et al. | 358/86 X |
| 4,814,869 | 3/1989 | Oliver, Jr. | 358/86 |

FOREIGN PATENT DOCUMENTS 63-99631  4/1988  Japan ..................................... 370/3

Primary Examiner—Keith E. George
Attorney, Agent, or Firm—Townsend and Townsend

[57] ABSTRACT

A broadband (RF) system using frequency agile demodulators or frequency agile modulators for coupling video cameras at remote locations to one or more video monitors at a central location. In a first embodiment, video cameras at remote locations are provided with respective modulators for coupling the outputs of the video cameras to a broadband coaxial or fiber-optic cable which couples all of the camera outputs to the input of a frequency agile demodulator at the central location. The output of the demodulator is coupled to one or more video monitors for display of the video signals from the remote cameras. The demodulator at the central location may be set to any camera channel manually or under processor control. Each video monitor can then view the video signals from any remote video camera by selecting the appropriate channel at the demodulator at the central location. If more than one viewing monitor is desired, a second or third demodulator which is frequency agile, may be connected to the cable at any location along the cable. In another embodiment, the central location may be provided with one or more video monitors with each monitor having a fixed frequency demodulator associated with it. The remote video cameras are provided with frequency agile modulators which are commanded to the appropriate monitor channel under processor control. Each video monitor to view the video signal of any remote camera by remotely selecting and enabling the appropriate monitor channel at the remote frequency agile modulators.

3 Claims, 3 Drawing Sheets

VIDEO SWITCHING SYSTEMS USING FREQUENCY AGILE MODULATORS AND DEMODULATORS

BACKGROUND OF THE INVENTION

This invention relates to improvements in the cable transmission of video signals over long distances from spaced locations remote from a central location at which the signals can be received and monitored.

It is often desirable to use a number of video cameras at locations remote from a central location to record activities at such remote locations. For instance, a conventional baseband (non-RF) system uses a number of remote cameras directly connected by individual coaxial lines to the inputs of a matrix switching apparatus at a central location whose output is connected to a video monitor. Such a system operates effectively if the distance from each camera to the matrix switching apparatus is less than several thousand feet. Since each camera has its own coaxial cable connecting the camera to the matrix switching apparatus at the central location, this results in high cable costs and excessive cable bundle size over such a distance.

In another multi-camera system of conventional design, a CATV system allows video signals to be distributed over considerably greater distances such as a number of miles between a central location and the various camera locations. However, each camera at a remote location has a RF video modulator interfacing the camera to a broadband coaxial or fiber-optic cable. The CATV system requires a demodulator at a central location for each modulator, respectively, the output of each demodulator being switched by a matrix switching apparatus to one or more video monitors.

The requirement for separate RF modulators and companion demodulator for each camera gives rise to large equipment costs as well as requiring a considerable amount of space for the demodulators at the central location. However, the use of broadband techniques and hardware allows a bundle of individual cables, such as is required for the baseband system described above, to be replaced with one broadband cable or fiber-optic cable. Also, this technology allows for two-way control suitable for camera position control and supervision.

Because of the relatively high costs and space requirements of conventional broadband systems of the type described, a need exists for improvements in broadband video systems which minimize such costs and space requirements without sacrificing the quality of video signals received at a central location from video cameras at remote locations. The present invention satisfies this need.

SUMMARY OF THE INVENTION

The present invention is directed to a broadband (RF) system using frequency agile demodulator or frequency agile modulators for coupling video cameras at remote locations to one or more video monitors at a central location. The selection and use of the demodulators are such as to reduce equipment costs as well as to minimize the space required for the equipment itself.

In a first embodiment of the system of the present invention, video cameras at remote locations which can be many miles from a central location, are provided with respective non-agile RF modulators for interfacing the outputs of the video cameras to a broadband coaxial or fiber-optic cable. This cable is connected to the input of a frequency agile demodulator at the central location. The output of the demodulator is presented to one or more video monitors for display of the video signals from the remote cameras.

The demodulator at the central location may be set to any camera channel manually or under processor control. It is then possible for each video monitor to view the video signals from any remote video camera by selecting the appropriate channel at the demodulator at the central location. Thus, the channel control of the demodulator represents an improvement over the action of the video matrix switching apparatus of conventional design, yet, the presence of the demodulator eliminates the need for the matrix switching apparatus to thereby minimize equipment costs and space needs for such equipment. If more than one viewing monitor is desired, a second or third demodulator which is frequency agile, may be connected to the broadband coaxial or fiber-optic cable at any location along the cable.

In another embodiment of the present invention, the central location may be provided with one or more video monitors with each monitor having a fixed frequency demodulator associated with it. The remote video cameras are provided with frequency agile modulators which are remotely commanded to the appropriate monitor channel under processor control. It is then possible for each video monitor to view the video signal of any other remote camera by remotely selecting and enabling the appropriate monitor channel at the remote frequency agile modulators. In this way, equipment costs and space requirements are minimized to avoid the drawbacks of the conventional baseband and broadband systems described above.

The primary object of the present invention is to provide an improved video switching system using remote, spaced video cameras for coupling such cameras to one or more video monitors at a central location wherein the system employs frequency agile modulators or frequency agile demodulators coupled to a broadband coaxial or fiber-optic cable to minimize equipment costs and space requirements to thereby render the operation of such a system highly efficient notwithstanding its being usable in many remote video camera applications.

Other objects of this invention will become apparent as the following specification progresses, reference being had to the accompanying drawings for an illustration of several embodiments of the invention.

DETAILED DESCRIPTION OF THE PREFERRED EMBODIMENT

Figure 1:
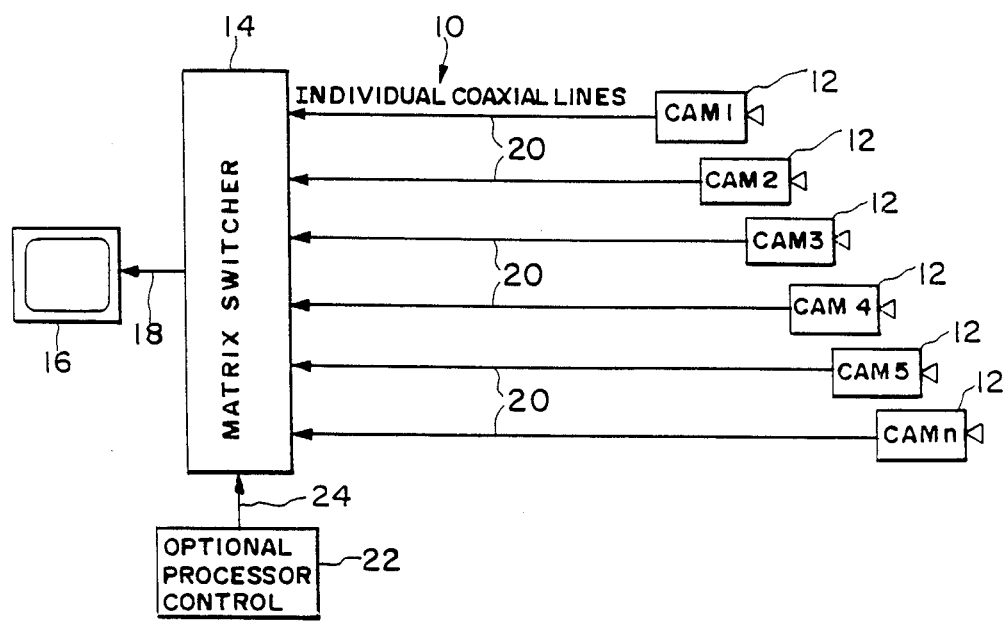
FIG. 1 is a schematic view of a prior art baseband (non-RF) system using a number of video cameras and a matrix switcher for coupling one or more video monitors to the cameras.

In FIG. 1, a conventional baseband (non-RF) system 10 is provided with a plurality of video cameras 12 which are at remote locations with respect to each other and with respect to a matrix switcher 14 near a central station having one or more video monitors 16 coupled by cables 18 to the matrix switcher 14. The video cameras may be, at most, a few thousand feet from matrix switcher 14, and individual coaxial lines 20 couple the cameras 12 to respective inputs of the matrix switcher 14 as shown in FIG. 1.

System 12 works well until the distances between the remote video cameras 12 and matrix switcher 14 become greater than a few thousand feet. Since each camera has its own coaxial line 20, a plurality of such lines results in massive and expensive cable runs in system 10 when it has a large number of video cameras 12.

Matrix switcher 14 has a processor control 22 coupled by cable 24 to the switcher. Control 22 causes switching of video signals from video cameras 12 by matrix switcher 14 so as to provide a particular video signal on video monitor 16 associated with the switcher.

Figure 2:
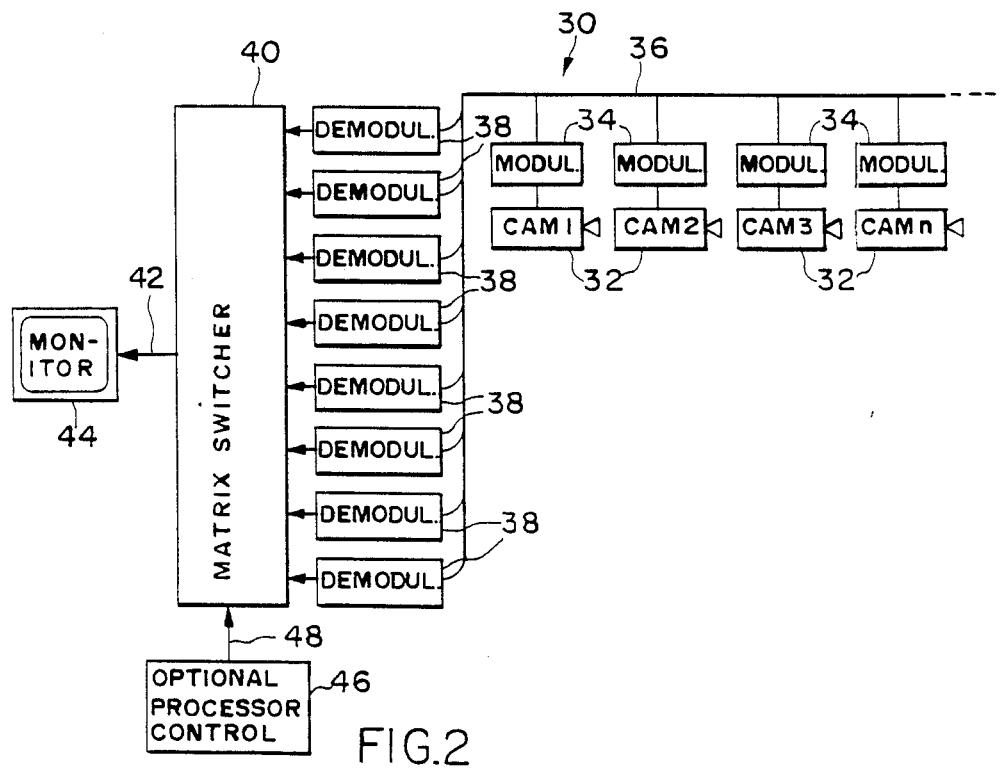
FIG. 2 is a schematic view of a prior art broadband (RF) system using a matrix switcher for a number of demodulators associated with respective cameras with each camera having modulator associated with it.

FIG. 2 illustrates a broadband (RF) system 30 which allows video signals to be distributed over considerably greater distances. In system 30, a plurality of remote video cameras 32 are coupled through respective fixed frequency modulators 34 to a broadband coaxial or fiber-optic cable 36 which is also coupled to a plurality of demodulators 38 arranged at a central location in parallel and coupled to respective inputs of a matrix switcher 40 whose output is coupled by a lead 42 to one or more monitors 44. An optional processor control 46 is coupled by a lead 48 with switcher 40 to control the switching action thereof so as to pass selected video signals to monitor 44.

The video cameras may be great distances apart from each other and from the demodulators 38, such as 50 miles or more apart. However, present technology requires that the separate fixed frequency (non-agile) RF modulators 34 be matched with fixed frequency (nonagile) RF demodulators 38 at the central monitoring station. This gives rise to space consuming banks of demodulators 38 and their relatively high costs.

Figure 3:
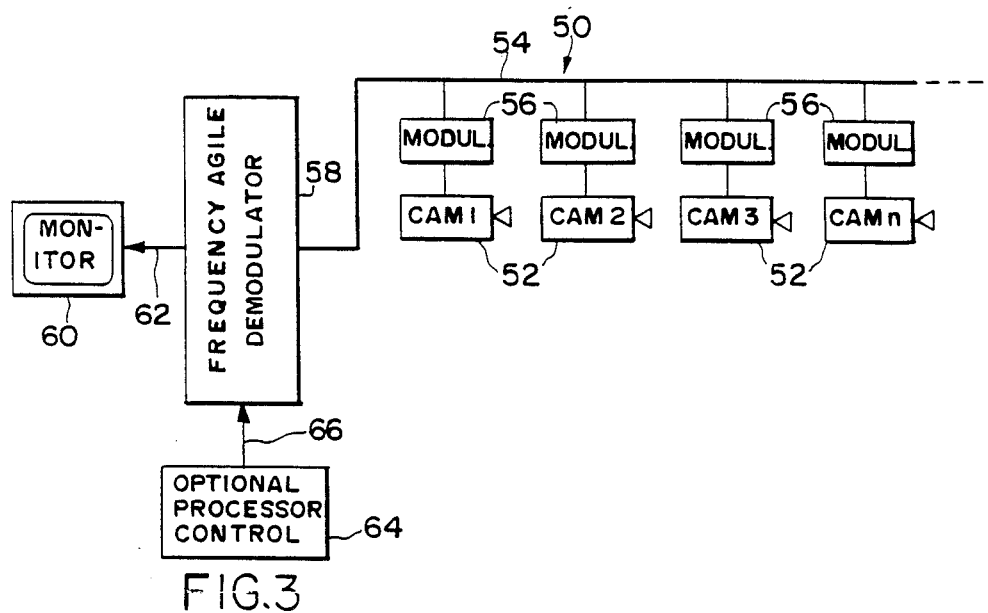
FIG. 3 is a schematic view of an improved broadband RF systems of the present invention showing a single frequency agile demodulator for coupling a number of remote video cameras selectively to one or more video monitors at a central location.

FIG. 3 shows an improved broadband (RF) system of the present invention and is denoted by the numeral 50. System 50 includes a plurality of remote video cameras 52 which are coupled to a broadband coaxial or fiber-optic cable 54, there being separate fixed frequency (non-agile) RF modulators 56 between cable 54 and respective cameras 52.

Cable 54 is coupled to a frequency agile demodulator 58 at a central location, and the demodulator 58 is coupled with one or more monitors 60 by lead 62. An optional processor control 64 is coupled by lead 66 with demodulator 58 to control the operation thereof.

The demodulator may be set to any video camera channel manually or under the influence of control 64. It is then possible for each monitor 60 to view any of the remote cameras by selecting the appropriate channel at the demodulator station. When the selection of the channel of the modulator 58 is under the influence of control 64, system 50 provides improvements over the action of a video matrix switcher. Such improvements eliminate the need for the external matrix switchers shown in FIGS. 1 and 2. If more than one viewing monitor 60 is desired, a second or third demodulator 58 may be connected to coaxial line 54. These monitors and demodulators may be placed anywhere along the cable 54, if desired for greater system flexibility.

Figure 4:
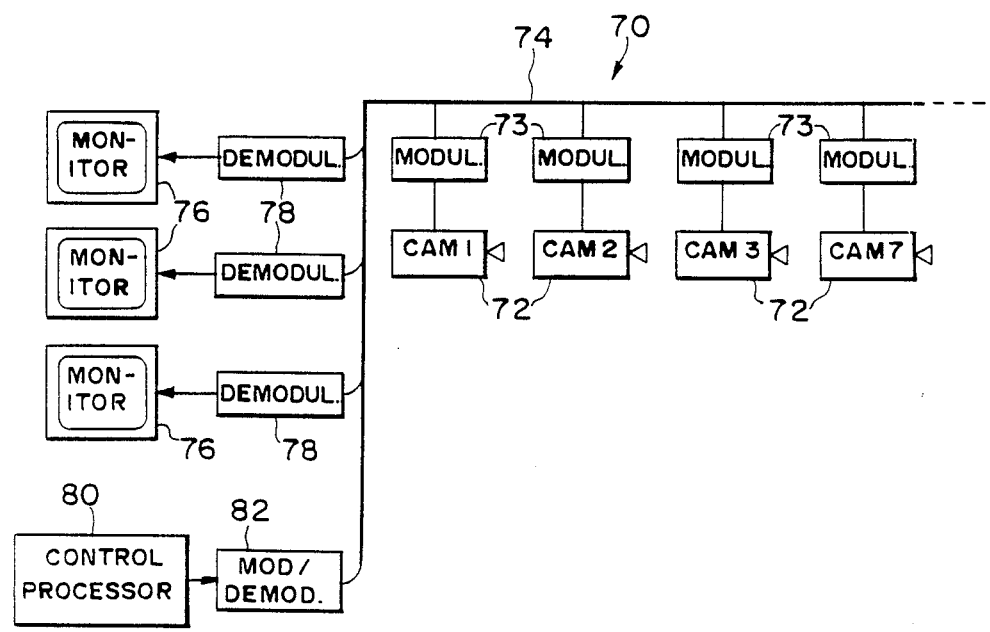
FIG. 4 is a schematic view of an improved agile modulator broadband (RF) system of the present invention, showing a number of RF demodulators, one per video monitor, and a number of remote video cameras having respective frequency agile modulators coupled by a coaxial cable to the demodulators.

Another improved broadband (RF) system is shown in FIG. 4 and is denoted by the numeral 70. System 70 includes a plurality of spaced, remote video cameras 72 which are coupled through respective frequency agile modulators 73 to a two-way broadband coaxial or fiber-optic cable 74 which is coupled to video monitors 76 at a central location. A fixed frequency demodulator 78 is provided for each video monitor 76, respectively, and a processor control 80 is coupled through a modulator/demodulator 82 to cable 74.

In operation, the remote, frequency agile modulators 73 are commanded to the appropriate monitor 76 under the influence of control 80. It is then possible for each monitor 76 to view the video signal of any of the remote cameras 72 by selecting and enabling the appropriate camera channel at the remote, frequency agile modulators 73.

The operation of system 70 is slightly more complex than that of system 50 (FIG. 3), but system 70 has several advantages over system 50. Firstly, the central station has two-way communication with the remote, frequency agile modulators 73. This feature provides for supervision of the control features, such as pan, tilt and zoom of the cameras 72. Secondly, there is no limit to the number of cameras 72 that can be placed on cable 74; whereas, system 50 is limited to the maximum number of channels available on the cable. System 70 also eliminates the need for matrix switchers, such as switchers 14 of system 10 and switcher 40 of system 30. If more than one viewing monitor 76 is desired, a second or third demodulator may be connected to the broadband coaxial line 74 as shown in FIG. 4. Monitors may also be placed anywhere along the cable 74, if desired.

I claim:

1. A broadband RF video surveillance system comprising:

a plurality of video surveillance cameras adapted to be placed at respective operative locations remote from a central monitoring location;

a cable extending from the central location to the remote locations;

a frequency agile modulator for each video camera, respectively, the modulators being coupled between the cable and respective cameras the modulators being responsive to control signals received over the cable to each select a modulation frequency;

a number of video monitors at said central location;

a demodulator for each monitor, respectively, the demodulators being coupled between the cable and respective monitors; and means at said central location for controlling the frequencies of the modulators by sending the modulator control signals over the cable to selectively direct the video signals from the video cameras to the monitors.

2. A system as set forth in claim 1, wherein is included a modulator/demodulator unit between the output of the control means and the cable to allow simultaneous supervisory and control functioning of the system.

3. A video signal surveillance method comprising:

generating video signals in a surveillance system at a number of operative camera locations remote from a central location;

modulating the generated video signals at the respective remote locations;

directing the modulated video signals along a unitary path from the respective remote locations to said central location;

demodulating one video signal at the central location;

monitoring the demodulated video signal; and controlling camera channel changes from said central location to provide for supervisory and control functioning of the system, said controlling step including controlling the channel frequencies at which the modulating at said remote locations is performed.

* * * * *